United States Patent [19]

Opelt

[11] Patent Number: 4,812,925

[45] Date of Patent: Mar. 14, 1989

[54] METHOD AND ARRANGEMENT FOR DROP-OUT COMPENSATION DURING THE REPRODUCTION OF MAGNETICALLY RECORDED SIGNALS

[76] Inventor: Christian Opelt, Tannenstrasse 12, D-8501 Veitsbronn, Fed. Rep. of Germany

[21] Appl. No.: 92,338

[22] Filed: Sep. 2, 1987

[30] Foreign Application Priority Data

Sep. 4, 1986 [DE] Fed. Rep. of Germany ....... 3630179

[51] Int. Cl.$^4$ .............................................. H04N 5/78
[52] U.S. Cl. ................................... 360/38.1; 358/336
[58] Field of Search ..................... 360/38.1; 358/314; 1/336

[56] References Cited

U.S. PATENT DOCUMENTS 4,541,018  9/1985  Watanabe ........................... 358/314

FOREIGN PATENT DOCUMENTS 3613798  10/1987  Fed. Rep. of Germany .

Primary Examiner—Eugene R. LaRoche
Assistant Examiner—David Mis
Attorney, Agent, or Firm—Bernard Franzblau

[57] ABSTRACT

A method for drop-out compensation during the reproduction of magnetically recorded signals, which signals are reproduced from several tracks of a record carrier and are combined into a monochannel signal. In this method, a drop-out identification signal is produced in each channel. Further, at least one bit combination of the digital signal exhibiting time errors is reserved for the transmission of the drop-out identification signal. The drop-out identification signal is subjected, together with the digital signal, to a time error correction. The drop-out identification signal, corrected with respect to time errors, is used for controlling a drop-out memory in a manner such that in the case of a drop-out, the output signal of the drop-out memory is inserted instead of the disturbed signal part into the monochannel signal corrected with respect to time errors, while with a non-disturbed signal, the drop-out memory is reloaded.

19 Claims, 1 Drawing Sheet

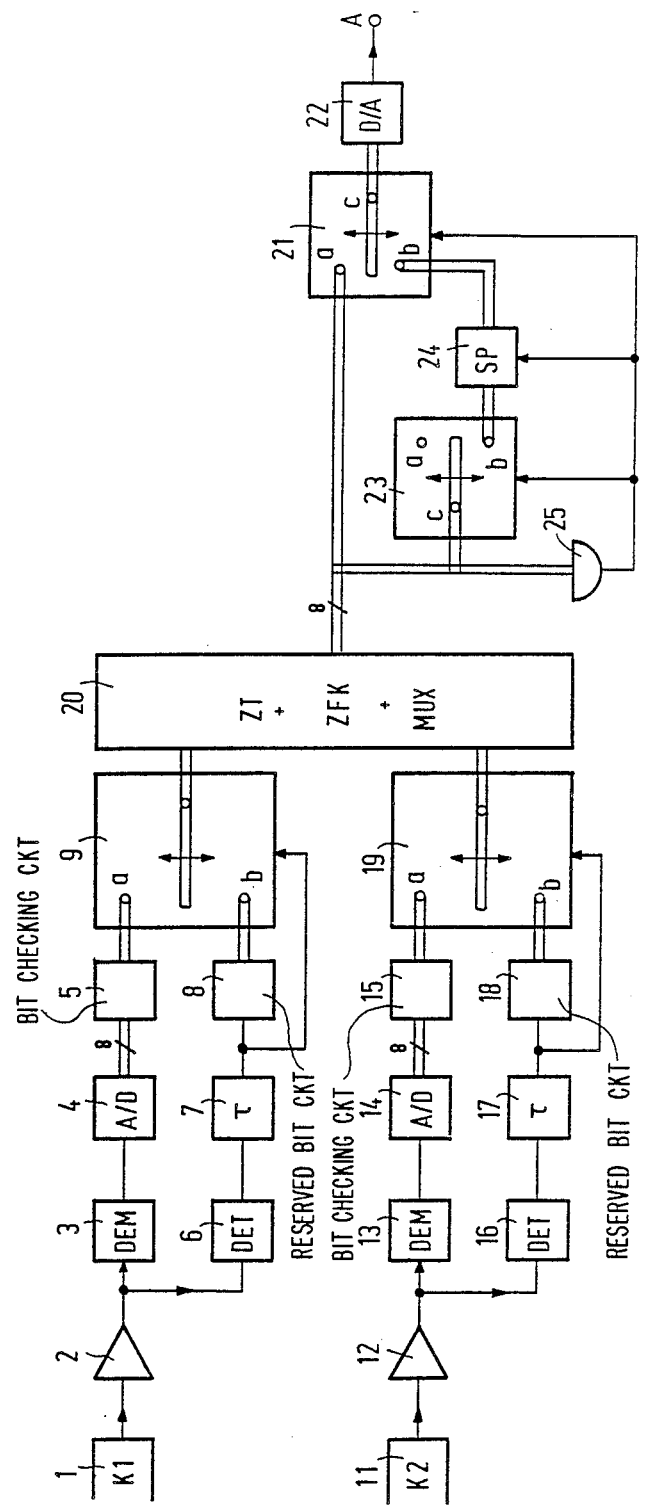

METHOD AND ARRANGEMENT FOR DROP-OUT COMPENSATION DURING THE REPRODUCTION OF MAGNETICALLY RECORDED SIGNALS

BACKGROUND OF THE INVENTION

The invention relates to a method and an arrangement for drop-out compensation during reproduction of magnetically recorded signals.

During reproduction of magnetically recorded signals, a circuit for drop-out compensation is usually employed. By means of this circuit, signal drop-outs in the reproduced signal are recorded and are replaced by information of preceding signal parts, which was temporarily stored in a drop-out memory. The drop-out compensation can take place either before or during the time error correction of the digital signal.

However, these known methods cannot be used if a multichannel recording is concerned (cf. the non-prepublished German Patent Application P No. 36 13 798 of 24-04-'86) and if, in the case of drop-out, information from another channel is to be inserted instead of the disturbed information because the signals reproduced from different tracks exhibit different time errors. In this case, a drop-out compensation can take place only after the time error correction.

SUMMARY OF THE INVENTION

An object of the invention is to provide a method by means of which a drop-out compensation can also be effected if, in the case of drop-out, information from another channel is to be inserted instead of the disturbed information.

This object is achieved in that in each channel at least one bit combination of the digital signal exhibiting time errors is reserved for the transmission of an identification signal, the digital signal including the identification signal is corrected with respect to time errors, and the identification signal corrected with respect to time errors is used for controlling the drop-out memory.

The advantages of the invention reside more particularly in the fact that an identification signal without time errors is made available at the output of the memory device used for time error correction without additional storage space being required for transmission of the identification signal. This identification signal is generated and is used for controlling the drop-out memory.

Further favorable properties will be apparent from an embodiment, which will be described more fully hereinafter with reference to the (sole) FIGURE.

DETAILED DESCRIPTION OF THE INVENTION

A broadband video signal is assumed to be recorded so that successive information parts are assigned to adjacent oblique tracks of a magnetic tape. In order to achieve this, for example, on the recording side the successive lines of a broadband video signal may be supplied to different memory elements of a memory and may be expanded there in time. These signals expanded in time are distributed over the two said oblique tracks. Such a recording method, on which the invention is based, is described, for example, in the aforementioned non-prepublished German Patent Application P 3613798.

During reproducing, such signals are reproduced by means of reproducing heads 1 and 11 (see the FIGURE). The reproduced signals, which exhibit different time errors, are amplified in reproducing amplifiers 2 and 12, respectively. The amplified signals arrive on the one hand at demodulators 3 and 13, respectively and on the other hand at drop-out detectors 6 and 16, respectively. The demodulated signals are digitized and converted into an 8-bit data current, respectively, in analog-to-digital converters 4 and 14, respectively.

By means of this 8-bit data current, $2^8 = 256$ different resolution stages in all can be represented. In circuits 5 and 15, respectively, the 8-bit data current is then checked as to whether a given predetermined bit combination occurs or does not occur. By way of example, the bit current may then be checked as to whether all bits are set.

If this is the case, the LSB (Least Significant Bit) is set to zero. Thus, it is ensured that all bits are never set at the output of the circuits 5 and 15, respectively. This leads in the end to a reduction of the signal resolution of 256 resolution stages by one to 255 resolution stages. This small reduction of the resolution cannot be observed by the human eye because the failing resolution stage is situated at the edge of the dynamic range.

If not all bits are set, the bit current arrives in an unchanged state at the output of the circuits 5 and 15, respectively.

The drop-out detectors 6 and 16, respectively check the reproduced signal—for example by evaluation of the envelope in the case of a frequency-modulated signal—with respect to drop-outs and each produces an identification signal, which provides information as to whether a drop-out occurs or does not occur. This identification signal is passed through a delay element 7 and 17, respectively in order to compensate for that delay to which the signal reproduced is subjected by the demodulation and the analog-to-digital conversion.

The delayed identification signal is used on the one hand to control the switches 9 and 19, respectively. With a non-disturbed signal, the switches 9 and 19, respectively are in the switching position a so that the switch is conductive for the output signals of the circuits 5 and 15, respectively. In the case of a drop-out, the switch is set to its switching position b so that the switch is conductive for the output signals of a circuits 8 and 18, respectively which produces, in the case of drop-out, the reserved bit combination. This combination is passed on via the switches 9 and 19, respectively and is thus inserted into the digital video signal.

The output signals of the switches 9 and 19, respectively are supplied to a circuit 20, in which the signals are corrected with respect to time errors and are combined into a monochannel signal. Such a circuit is described, for example, in the aforementioned non-prepublished German Patent Application P No. 3613798 and can consist of a memory comprising several memory elements (RAM's) and of a multiplexer.

A monochannel 8-bit data current corrected with respect to time errors is applied to the output of the circuit 20. This current is supplied to the contact a of a switch 21, to the contact c of a switch 23 and to a circuit 25 for evaluating the data current corrected with respect to time errors.

The circuit 25 may be an AND gate in the case where the reserved bit combination solely consists of logical "ones".

The output signal of the AND gate 25 is supplied to the respective control inputs of the switch 23, of a drop-out memory 24 and the switch 21.

With a non-disturbed signal, the switch 23 is in its switching position b and the switch 21 is in the switching position a. Consequently, the non-disturbed signal applied to the output of the circuit 20 and corrected with respect to time errors reaches via the switch 21 and the digital-to-analog converter 22 the output A of the circuit.

Further, the non-disturbed signal applied to the output of the circuit 20 and corrected with respect to time errors reaches via the switch 23 the drop-out memory 24 and is stored therein. In the case of a drop-out, the switch 23 is in its switching position a and the switch 21 is in the switching position b. Consequently, the disturbed signal applied to the output of the circuit 20 and corrected with respect to time errors is separated both from the output A of the whole circuit and from the drop-out memory 24. Instead thereof, a signal stored in the drop-out memory 24 reaches via the switch 21 and the digital-to-analogue converter 22 the output A of the circuit.

By means of the arrangement described, the signal reproduced and exhibiting time errors of each of the channels is therefore checked before the demodulation with respect to drop-outs and per channel an identification signal is produced. To this identification signal is assigned a bit combination, which corresponds to a given resolution stage or bit combination of the digital video signal. The path of the digital video signal includes a circuit which excludes that this given bit combination occurs in the video signal. In the case of a drop-out, the identification signal is keyed into the video signal and is subjected together with it to the time error correction. After the time error correction, a signal without time errors is available, which can be used for controlling the drop-out memory or the drop-out process.

An advantageous further embodiment of the invention consists in that further bit combinations of the signal exhibiting time errors are reserved for the transmission of arbitrary additional information. Care should only be taken that rarely occurring bit combinations are used, preferably at the edge of the dynamic range.

What is claimed is:

1. A method of drop-out compensation during the reproduction of magnetically recorded signals, which are reproduced from several tracks of a record carrier, comprising the steps of
   producing an identification signal in each channel by evaluation of the signal reproduced, which identification signal indicates whether a drop-out occurs or does not occur,
   correcting the signals in digital form with respect to time errors and combining the corrected signals into a monochannel signal,
   in the case of a drop-out, inserting the output signal of a drop-out memory instead of the disturbed signal part into the monochannel signal corrected with respect to time errors,
   in each channel, reserving at least one bit combination of the digital signal exhibiting time errors for the transmission of the identification signal,
   correcting the digital signal comprising the identification signal with respect to time errors, and
   controlling the drop-out memory by the identification signal corrected with respect to time errors.

2. A method as claimed in claim 1, wherein a rarely occurring bit combination is used as the identification signal.

3. A method as claimed in claim 1, wherein the digital signal comprising the identification signal not being corrected in time is subjected to a time transformation.

4. A method as claimed in claim 1 further comprising delaying the identification signal before it is inserted into the digital signal.

5. A method as claimed in claim 1 wherein further bit combinations are reserved for the transmission of additional information.

6. A method as claimed in claim 2, wherein the digital signal comprising the identification signal not being corrected in time is subjected to a time transformation.

7. A method as claimed in claim 2 wherein the identification signal is delayed before being inserted into the digital signal.

8. A method as claimed in claim 3 wherein the identification signal is delayed before being inserted into the digital signal.

9. An arrangement for drop-out compensation during the reproduction of magnetically recorded signals, which are reproduced from several tracks of a record carrier, comprising:
   a drop-out detector in each channel which checks the reproduced signal exhibiting time errors with respect to drop-outs and produces an identification signal,
   a circuit for time error correction to which the reproduced signals are supplied in digital form,
   a circuit for combining the multichannel signal into a monochannel signal,
   a drop-out memory, whose output signal is keyed into the monochannel signal in the case of drop-out,
   circuits which are arranged in each channel and reserve at least one bit combination of the respective digital signals exhibiting time errors for the transmission of the identification signal,
   circuits arranged in each channel for keying the identification signal into the respective digital signals, and
   a circuit for detecting the identification signal to produce an output signal used for controlling the drop-out memory.

10. An arrangement as claimed in claim 9, wherein the circuits reserve a rarely occurring bit combination of the digital signal for the transmission of the identification signal.

11. An arrangement as claimed in claim 9, wherein the keying circuits are switches.

12. An arrangement as claimed in claim 9, wherein the detecting circuit is an AND element.

13. An arrangement as claimed in claim 9, wherein the circuit for time error correction has several RAM's, in which the signal is additionally transformed in time.

14. An arrangement as claimed in claim 9, wherein in each channel, the output signal of the drop-out detector is supplied to a delay element.

15. An arrangement as claimed in claim 10, wherein the keying circuits are switches.

16. An arrangement as claimed in claim 10, wherein the detecting circuit is an AND element.

17. An arrangement as claimed in claim 11, wherein the detecting circuit is an AND element.

18. A drop-out compensation apparatus for signals magnetically recorded on a plurality of tracks of a record carrier comprising:

at least first and second signal channels coupled to first and second pick-up heads, respectively, associated with respective first and second ones of said plurality of tracks, each of said first and second channels comprising switching means having first and second signal inputs and a control input, each of said first and second channels further comprising a demodulator and an A/D converter connected in cascade in a first signal path between its respective pick-up head and the first signal input of its respective switching means, each of said first and second channels also comprising a second signal path between its respective pick-up head and the second input of its respective switching means, wherein each second signal path includes, in cascade, a drop-out detector and a circuit responsive to an ID signal from the drop-out detector for supplying a reserved bit combination signal to said second signal input of the switching means, means coupling the control input of each switching means to an output of the drop-out detector in its respective signal channel, a circuit for time error correction of digital signals and for combining digital signals from the first and second channels into a monochannel signal, said circuit having first and second inputs coupled to respective outputs of the switching means in said first and second signal channels, a drop-out memory selectively coupled to an output of said correction and combining circuit, and further switching means for selectively coupling an output of said apparatus to an output of the drop-out memory or said output of said correction and combining circuit as a function of the ID signal produced by the drop-out detector.

19. Apparatus as claimed in claim 18 wherein each said coupling means in each said second signal path further comprises time delay means coupled in cascade between its respective drop-out detector and its ID signal responsive circuit.

* * * * *